United States Patent Office 3,275,788
Patented Sept. 27, 1966

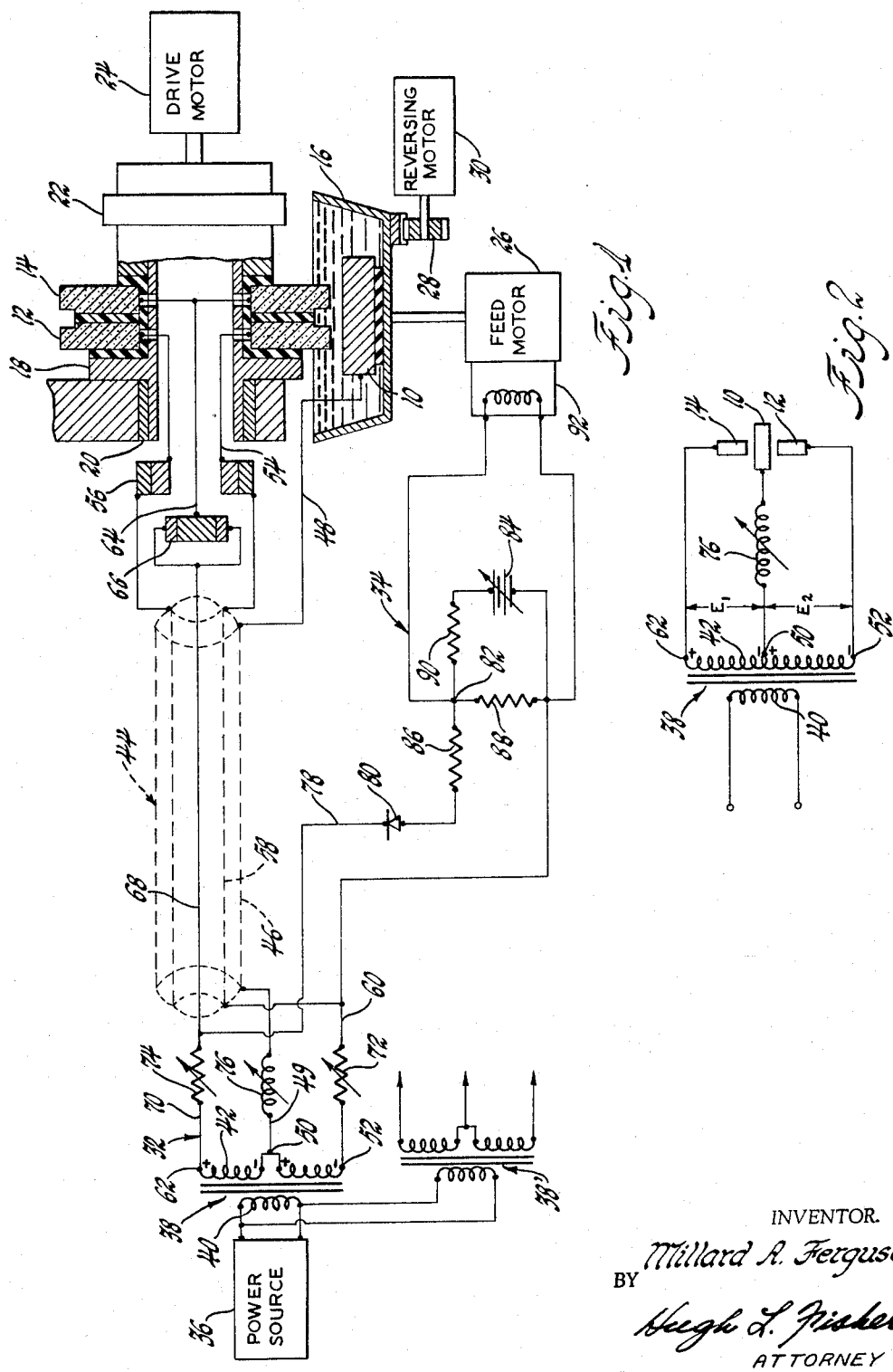

3,275,788
ELECTRICAL DISCHARGE MACHINING APPARATUS
Millard A. Ferguson, Utica, Mich., assignor to General Motors Corporation, Detroit, Mich., a corporation of Delaware
Filed Nov. 21, 1963, Ser. No. 325,394
14 Claims. (Cl. 219—69)

This invention relates to improvements in electrical stock removal apparatus.

The use of present commercially available electrical stock removal apparatus, e.g. that employed for electrical discharge machining, is somewhat restricted because of its limitations as to rate of stock removal, quality of finish, dimensional accuracy. These shortcomings are significant if the EDM process is to be used for grinding. The reason for this is that the cutting tools will be wheels revolvably supported on an appropriate spindle. Necessarily then, the electrical connections to the wheels involve relatively long leads and consequently large inductances. Such large inductances produce several adverse effects. Among these is the need to increase the output from the power supply to compensate for the increased voltage drops from the large inductances. This usually requires that the size of the power supply be increased to gain the necessary voltage and, accordingly, the proper current flow. Then too, to operate at higher frequencies greater voltages are needed to supply the current at these increased frequencies. If excessive voltage drops already exist, there is no choice but to either increase the size of the power supply or operate it at a lower frequency.

Another related concern is the heating of the various elements of the apparatus, such as the spindle, from secondary currents. It will be appreciated that the heating of a spindle produces dimensional instability and this will be reflected in the accuracy of the work.

With the foregoing in mind, electrical stock removal apparatus is now proposed incorporating a novel power supply that facilitates the use of high frequency currents, that permits greater current flow, and that minimizes the heating of the apparatus elements from secondary currents.

The invention further contemplates unique electrical stock removal apparatus employing plural cutting tools that are furnished electrical power in a new and different way whereby conduction across one cutting tool gap in effect promotes conduction across the other cutting tool gap.

The invention also seeks to provide electrical stock removal apparatus that is particularly suited for grinding. Features of this grinding apparatus includes the provisions for maneuvering the workpiece with respect to plural cutting wheels, low inductance connections between the cutting wheels and the source of power, and the mode of increasing the voltage across whichever gap is nonconductive until conduction occurs, and the minimizing of the heating of the spindle on which the cutting wheels are mounted.

In carrying out the invention according to a preferred embodiment, electrical stock removal apparatus is provided with a pair of cutting wheels connected in circuit with each other so as to have opposite polarity voltages applied across gaps formed with a workpiece and so as to include a common impedance, such that when one gap becomes conductive the voltage across the nonconductive gap is increased to facilitate its conduction.

The foregoing and other objects and advantages of the invention will become apparent from the following description and the accompanying drawings, in which:

FIGURE 1 is a schematic diagram of electrical stock removal apparatus incorporating the principles of the invention; and FIGURE 2 is a simplified circuit diagram of the power supply for the apparatus.

Referring now to the drawings in detail and initially to FIGURE 1, the numeral 10 denotes a conductive workpiece and the numerals 12 and 14 denote conductive cutting wheels. The workpiece 10 may, for exemplary purposes, be a die blank in which rack teeth are to be cut. The workpiece 10 is mounted within a trough 16 and is suitably insulated therefrom. The trough 16 is filled with a dielectric fluid from a source, not shown. The cutting wheels 12 and 14 may be formed of any known conductive material, but are preferably made of some type of inexpensive and easily "dressed" material, such as synthetic graphite, and are joined together by an electrical insulator, e.g. epoxy cement. The cutting wheels 12 and 14 are mounted on the hollow spindle 18 in such a way as to be revolvable therewith and also insulated therefrom. The spindle 18 is in turn revolvably supported at 20 and by a coupling 22 is connected to a drive motor 24, which will revolve the cutting wheels 12 and 14 at some selected speed.

The gap spacing or the up and down movement between the cutting wheels 12 and 14 and the workpiece 10 is altered by a suitable feed motor 26, e.g. of the fluid pressure operated piston type. If wanted, the trough 16 and accordingly the workpiece 10 can be moved in a fore and aft direction typical of a surface grinder, i.e. in a plane perpendicular to the plane of gap spacing movement, through the agency of a rack and pinion, designated generally at 28, and any conventional reversing motor 30. The actual arrangements of the feed motor 26 and the reversing motor 30 will be determined by different design factors as will be appreciated by those skilled in the art. Necessarily, the reversing motor 30 will have to be properly situated to move with the trough 16 when it is moved up and down. Of course, if preferred, the cutting wheels 12 and 14 can be moved up and down in any customary way rather than have the workpiece 10 so move.

The apparatus is completed by a power supply, designated generally at 32, and a gap spacing control circuit, shown at 34, such that the power supply 32 provides the voltage for inducing electrical stock removal discharges across the gap between the cutting wheels 12 and 14 and the workpiece 10 in the presence of the dielectric fluid. These discharges in a known way erode the surface of the workpiece 10. The proper gap spacing is maintained by the gap control circuit 34 through, as will be explained, its control of the feed motor 26. In operation, while maintaining a certain preselected gap spacing as the wheels 12 and 14 are rotated by the drive motor 24 and as the trough 16 is moved fore and aft by the motor 30, the cutting wheels 12 and 14 will machine the rack teeth in the face of the workpiece 10.

Considering now the power supply 32, as shown the power supply 32 derives power from a suitable high frequency pulse source 36, such as a high frequency oscillator, having an output that by way of example only may be 1 mc. The power source 36 is coupled to the gaps between the cutting wheels 12 and 14 and the workpiece 10 by a transformer 38 that has a primary winding 40 connected to the power source 36 and a secondary winding 42 that is connected to the gaps through a three conductor coax arrangement, viewed generally at 44.

As just mentioned, all of the actual connections of the secondary winding 42 to the workpiece 10 and to the cutting wheels 12 and 14 are via parts of the coax 44. Therefore, the inductance resulting from the necessary long leads is minimized. For example, an outer hollow conductor 46 for coax 44 joins a flexible cable 48 to the workpiece 10 and a center conductor 49 to an in-between tap 50. In the preferred embodiment, the tap 50 is made at the center of the secondary winding 42 to achieve a balance and apply equal but opposite polarity voltages across the gaps. The reasons for this will become more apparent. The position of the tap 50, of course, can be varied to meet different requirements. The cutting wheel 12 is connected to an outer tap 52 on the secondary winding through an outer conductor 54 inside the spindle 18, brushes 56, an inner hollow conductor 58 for the coax 44 and an outer conductor 60. The cutting wheel 14 is connected to an outer tap 62 by way of a middle conductor 64 inside the spindle 18, brushes 66, a center conductor 68 for the coax 44 and an outer conductor 70. The outer conductors 60 and 70 have adjustable current limiting resistors 72 and 74, respectively, and the center conductor 49 has installed therein an adjustable impedance, such as an inductor 76.

The gap spacing control circuit 34 is connected across the secondary winding 42 by conductors 60 and 78. The conductor 78 includes a rectifier 80 for developing a D.C. voltage that is compared at a summing junction 82 with a reference voltage derived from an adjustable D.C. source 84. The desired voltage proportioning is achieved by resistors 86, 88 and 90. Any differential between the rectified voltage, which corresponds to the actual gap spacing, and the reference voltage, which reflects the desired gap spacing, results in an error signal that is utilized by a conventional force motor 92 to control the operation of the fluid pressure actuated feed motor 26. A more detailed explanation of the force motor 92 and the feed motor 26 will be found in the patent to Colten et al. 3,059,150.

Considering now the operation of the apparatus, to initiate operation the drive motor 24 is started, the power source 36 turned on, and the workpiece 10 moved until within the proximity of the cutting wheels 12 and 14. Referring now to FIGURE 2, the FIGURE 1 circuit diagram has been simplified by assuming that the current limiting resistors 72 and 74 have been shorted out. It has been previously mentioned that a balanced arrangement is preferred; hence, the voltage $E_1$ between the center tap 50 and the outer tap 62 will be equal to the voltage $E_2$ between the center tap 50 and the outer tap 52. By applying simultaneously the same voltages across the gaps except of the opposite polarity, each gap should be encouraged to break down or ionize at the same time; however, as a practical matter this does not happen. Because of the many variable one or the other of the gaps will ionize first. If, for demonstration purposes, the gap between the workpiece 10 and the cutting wheel 14 is assumed to break down first, current will commence flowing around the upper loop of the FIGURE 2 diagram. When this happens a voltage drop will occur across the inductor 76 and, therefore, the nonconducting gap between the cutting wheel 12 and the workpiece 10 will at this time have the open circuit voltage $E_2$ increased by the amount of this voltage drop across the inductor 76. This voltage drop, by the proper selection of parameters, will be adequate to insure that the gap between the cutting wheel 12 and the workpiece 10 becomes conductive, which is almost immediate due to this added boost or increase. This boost can be as much as 25% to 50%. Of course, the gap between the cutting wheel 12 and the workpiece 10 could initially become conductive, which in effect would increase the voltage across the other gap in the same fashion.

By utilizing the three conductor coax 44 the inductance has been kept to a minimum. If this minimum inductance is not adequate to produce the desired voltage drop, then the inductor 76 is adjusted as needed. An inductor has been shown primarily because of the somewhat inherent inductance in the power supply. If wanted, the inductor 76 could be replaced by an adjustable resistor.

As soon as both gaps are conductive the current flow, with the polarities indicated in FIGURE 1, will be from the secondary winding outer tap 62, through the outer conductor 70, the current limiting resistor 74, the center conductor 68, the brushes 66, the middle spindle conductor 64, the cutting wheel 14, and across the gap to the workpiece 10. From the workpiece 10 the current flows back across the other gap to the cutting wheel 12, then via the outer spindle conductor 54, the brushes 56, the inner conductor 58, the outer secondary winding conductor 60, the current limiting resistor 72, and to the outer tap 52. Because, as mentioned, the polarity of the voltage across the gap between the cutting wheel 12 and the workpiece 10 is the opposite of that voltage across the gap between the cutting wheel 14 and the workpiece 10, there is relatively no current flow through the flexible conductor 48 and to the center tap 50, via the outer hollow conductor 46. This is particularly desirable since the flexible conductor 48 represents a rather lengthy noncoaxial current path and would introduce an additional and unwanted inductive voltage drop.

At this point, it is probably appropriate to explain that, since with both gaps conductive, virtually all of the current flows through the coaxial paths within the spindle 18 and the coax 44. Consequently, there is no high frequency heating of the spindle 18. This spindle heating could produce dimensional problems particularly if runout should develop. The reduction in the voltage drop results in a greater current flow for a given available voltage. Consequently, the power supply output voltage is used more effectively, thus negating the need for large voltages to compensate for excessive voltage drops in the system. This means that the equipment can be smaller and there is less chance of overcut from large open circuit voltages. Moreover, higher frequencies are now obtainable with a given voltage. Again, if an excessive amount of voltage is lost during operation either the frequency must be reduced, keeping in mind that it takes a higher voltage to supply current at higher frequencies, or the voltage increased. These higher frequencies are particularly desirable for achieving finer surface finishes, such as those desired with any grinding application.

During the operation, the gap spacing control circuit 34 is continuously operative, being connected across the secondary winding 42 so that any changes in the gap voltages will be reflected in the secondary winding voltage and, accordingly, rectified and compared at the summing junction 82 with the reference voltage from the D.C. source 84. Any deviation in the desired gap spacing established by the reference voltage produces, as explained, an error signal. The force motor 92 responds to this error signal and causes the feed motor 26 to move the workpiece 10 in the proper correction direction. As soon as the desired gap spacing is re-established, the error signal is nulled. As a practical matter both gaps are always conductive as far as the gap spacing control circuit 34 is concerned. This is because any one gap is nonconductive only for a very short time due to the previously described feature affording the increased voltage across the nonconducting gap.

Another feature of the apparatus is that other transformers, such as a transformer 38', can be connected in parallel with the transformer 38 and served by the same power source 36. This permits additional cutting wheels to be used or even separate apparatus can be served by the same power source 36. The structure associated with the transformer 38' would be identical to that just explained and, therefore, is not shown or described again.

From the foregoing it will be appreciated that the apparatus is particularly suited for precision grinding operations. The power supply minimizes inductive losses, which are usually characteristic of apparatus used for grinding operations due to the need to connect the power supply by long leads through the spindle to the cutting wheels.

These problems are overcome by the multiple coax arrangement. Moreover, the problem of maintaining both of the gaps conductive at all times is overcome by the voltage increase derived through the common impedance furnished in the previously described way.

The invention is to be limited only by the following claims.

What is claimed is:

1. In electrical stock removal apparatus, the combination of a conductive workpiece, a pair of conductive cutting tools each spaced from the workpiece so as to form a machining gap therebetween, and means simultaneously supplying voltages across the gaps of opposite polarity for rendering the gaps conductive so that electrical stock removal discharges occur thereacross, the supplying means including means operative when one of the gaps is nonconductive to increase the voltage across the nonconductive gap thereby facilitating the rendering of the nonconductive gap conductive.

2. In electrical stock removal apparatus, the combination of a conductive workpiece, a pair of conductive cutting tools each spaced from the workpiece so as to form a machining gap therebetween, means simultaneously supplying a voltage of one polarity across one gap and a voltage of an opposite polarity across the other gap so as to render the gaps conductive and thereby produce electrical stock removal discharges thereacross, and voltage increasing means including an impedance common to both gaps and effective when one of the gaps is nonconductive to increase the voltage across the nonconductive gap thereby facilitating the rendering of the nonconductive gap conductive.

3. In electrical stock removal apparatus, the combination of a conductive workpiece, a pair of conductive cutting tools each spaced from the workpiece so as to form an ionizable machining gap therebetween, and power supply means for rendering the gaps conductive so that electrical stock removal discharges occur thereacross, the power supply means including a voltage supply circuit connected across each gap, the voltage supply circuits providing opposite polarity voltages and having a common impedance operative when one of the gaps is nonconductive to increase the voltage across the nonconductive gap thereby facilitating the rendering of the nonconductive gap conductive.

4. In electrical stock removal apparatus, the combination of a conductive workpiece, a pair of conductive cutting tools each spaced from the workpiece so as to form an ionizable machining gap therebetween, and power supply means for rendering the gaps conductive so that electrical stock removal discharges occur thereacross, the power supply means including a voltage supply circuit for each cutting tool, low inductance means connecting the voltage supply circuits across each gap, the voltage supply circuits providing opposite polarity voltages to the gaps and also including means operative when one of the gaps is nonconductive to increase the voltage across the nonconductive gap thereby facilitating the rendering of the nonconductive gap conductive.

5. In electrical stock removal apparatus, the combination of a conductive workpiece, a pair of conductive cutting tools each spaced from the workpiece so as to form an ionizable machining gap therebetween, power supply means for rendering the gaps conductive so that electrical stock removal discharges occur thereacross, the power supply means including a voltage supply circuit for each cutting tool, the voltage supply circuits including a plural conductor coax so arranged as to connect each voltage supply circuit across one of the gaps thereby affording low inductance current path to the gaps, the voltage supply circuits having a common line provided with a certain impedance and so arranged that when one of the gaps is nonconductive the voltage across the nonconductive gap is increased thereby facilitating the rendering of the nonconductive gap conductive.

6. In electrical stock removal apparatus, the combination of a conductive workpiece, a pair of conductive cutting tools each spaced from the workpiece so as to form an ionizable machining gap therebetween, and power supply means for rendering the gaps conductive so that electrical stock removal discharges occur thereacross, the power supply means including a source of alternating voltage, a transformer having a primary winding connected to the source and a secondary winding provided with outer taps and an in-between tap, a plural conductor coax so arranged as to connect the outer taps each to one of the cutting tools and the in-between tap to the workpiece thereby providing low inductance current paths between the secondary winding and the gaps, and a certain impedance between the in-between tap and the workpiece effective when one of the gaps is nonconductive to increase the voltage across the nonconductive gap thereby facilitating the rendering of the nonconductive gap conductive.

7. In electrical stock removal apparatus, the combination of a conductive workpiece, a pair of conductive cutting tool electrodes each spaced from the workpiece so as to form a machining gap therebetween, and power supply means for rendering the gaps conductive so that electrical stock removal discharges occur thereacross, the power supply means including a source of alternating voltage, a transformer having a primary winding connected to the source, a secondary winding provided with outer taps each connected to one of the cutting tools and in-between tap, a conductor for connecting the in-between tap and the workpiece, the conductor having a certain inductive impedance therein and common to both gaps so that when one of the gaps is nonconductive and the other gap is conductive the inductive impedance will cause the voltage across the nonconductive gap to be increased by the inductive voltage drop thereacross due to the conduction by the other gap and thereby facilitating the rendering of the nonconductive gap conductive.

8. In electrical stock removal apparatus, the combination of a conductive workpiece, a pair of conductive cutting wheels each spaced from the workpiece so as to form a machining gap therebetween, means revolving the wheels, and means simultaneously supplying voltage across the gaps of opposite polarity for rendering the gaps conductive so that electrical stock removal discharges occur thereacross, the supplying means including means operative when one of the gaps is nonconductive to increase the voltage across the nonconductive gap thereby facilitating the rendering of the nonconductive gap conductive.

9. In electrical stock removal apparatus, the combination of a conductive workpiece, a pair of conductive cutting wheels each spaced from the workpiece so as to form an ionizable machining gap therebetween, means revolving the wheels, and power supply means for rendering the gaps conductive so that the electrical stock removal discharges occur thereacross, the power supply means including a voltage supply circuit for each cutting tool, low inductance means for connecting each of the voltage supply circuits across one of the gaps, the voltage supply circuits also having means common thereto and operative when one of the gaps is nonconductive to increase the voltage across the nonconductive gap thereby facilitating the rendering of the nonconductive gap conductive.

10. In electrical stock removal apparatus, the combination of a conductive workpiece, a pair of conductive cutting wheels each spaced from the workpiece so as to form an ionizable machining gap therebetween, means revolving the wheels, and power supply means for rendering the gaps conductive so that electrical stock removal discharges occur thereacross, the power supply means including a voltage supply circuit connected across each gap, the voltage supply circuits being so arranged as to provide opposite polarity voltages to the gaps and also including a certain common impedance such that when one of the gaps is nonconductive the voltage across the nonconductive gap will be increased thereby facilitating the rendering of the nonconductive gap conductive.

11. In electrical stock removal apparatus, the combination of a conductive workpiece, a pair of conductive cutting wheels each spaced from the workpiece so as to form an ionizable machining gap therebetween, means revolving the wheels relative to the workpiece, and power supply means for rendering the gaps conductive so that electrical stock removal discharges occur thereacross, the power supply means including a voltage supply circuit for each cutting tool, a plural conductor coax so arranged as to connect each of the voltage supply circuits across the one of the gaps so as to form low impedance current paths therebetween, the voltage supply circuits being so arranged as to provide opposite polarity voltages and having a common impedance operative when one of the gaps is nonconductive to increase the voltage across the nonconductive gap thereby facilitating the rendering of the nonconductive gap conductive.

12. In electrical stock removal apparatus, the combination of a conductive workpiece, a pair of conductive cutting wheels spaced from the workpiece so as to form an ionizable machining gap therebetween, means revolving the wheels, and power supply means for rendering the gaps conductive so that electrical stock removal discharges occur thereacross, the power supply means including a source of alternating voltage, a transformer having a primary winding connected to the source and a secondary winding provided with outer taps and an in-between tap, a plural conductor coax for connecting the outer taps each to one of the cutting wheels and the in-between tap to the workpiece so as to provide low inductance current paths therebetween, and a certain inductive impedance arranged between the in-between tap and the work-piece so as to be common to both gaps and thereby operative when one of the gaps is nonconductive and the other gap is conductive the inductive impendance will cause the voltage across the nonconductive gap to be increased by the inductive voltage drop thereacross due to the conduction by the other gap and thereby facilitate the rendering of the nonconductive gap conductive.

13. In electrical stock removal apparatus, the combination of a conductive workpiece, a pair of conductive cutting wheels each spaced from the workpiece so as to form an ionizable machining gap therebetween, means revolving the wheels relative to the workpiece, means responsive to a certain gap condition for maneuvering the wheels and the workpiece relative to each other in a certain plane so as to establish a predetermined gap between the wheels and the workpiece, and means maneuvering the workpiece in a plane transverse to the certain plane, and power supply means for rendering the gaps conductive so that electrical stock removal discharges occur thereacross, the power supply means including a pair of voltage supply circuits, low inductance means connecting the voltage supply circuits each to one of the gaps, the voltage supply circuits being so arranged as to provide opposite polarity voltages and also having a certain impedance common to each circuit and effective when one of the gaps is nonconductive to increase the voltage across the nonconductive gap thereby facilitating the rendering of the nonconductive gap conductive.

14. In electrical stock removal apparatus, the combination of a conductive workpiece, a pair of conductive cutting wheels each spaced from the workpiece so as to form an ionizable machining gap therebetween, means revolving the wheels, means responsive to gap voltage for maneuvering the workpiece in one plane relative to the wheels so as to maintain a predetermined gap spacing, means maneuvering the workpiece in another plane transverse to the one plane of movement, and power supply means for rendering the gaps conductive so that electrical stock removal discharges occur thereacross, the power supply means including a source of alternating voltage, a transformer having a primary winding connected to the source and a secondary winding having outer taps and a center tap, a plural conductor coax for connecting the outer taps each to one of the cutting wheels and the center tap to the workpiece so as to be common to both gaps, the secondary winding outer taps being so arranged as to provide opposite polarity and equal voltages to the gaps, and a certain impedance between the center tap and the workpiece such that when one of the gaps is nonconductive the impedance will cause the voltage across the nonconductive gap to be increased thereby facilitating the rendering of the nonconductive gap conductive.

References Cited by the Examiner

UNITED STATES PATENTS

| 2,196,886 | 4/1940 | Adams | 307—12 X |
| 2,785,279 | 3/1957 | Williams | 219—69 |
| 3,067,317 | 12/1962 | Buro | 219—69 |
| 3,080,504 | 3/1963 | Early | 219—69 X |

FOREIGN PATENTS

| 906,840 | 3/1954 | Germany. |

ANTHONY BARTIS, *Acting Primary Examiner.*

RICHARD M. WOOD, *Examiner.*

R. F. STAUBLY, *Assistant Examiner.*